Dec. 8, 1936.   O. E. ANDRUS   2,063,778
PURIFIER FOR DRINKING WATER
Filed Sept. 19, 1932   3 Sheets-Sheet 1

INVENTOR.
Orrin E. Andrus

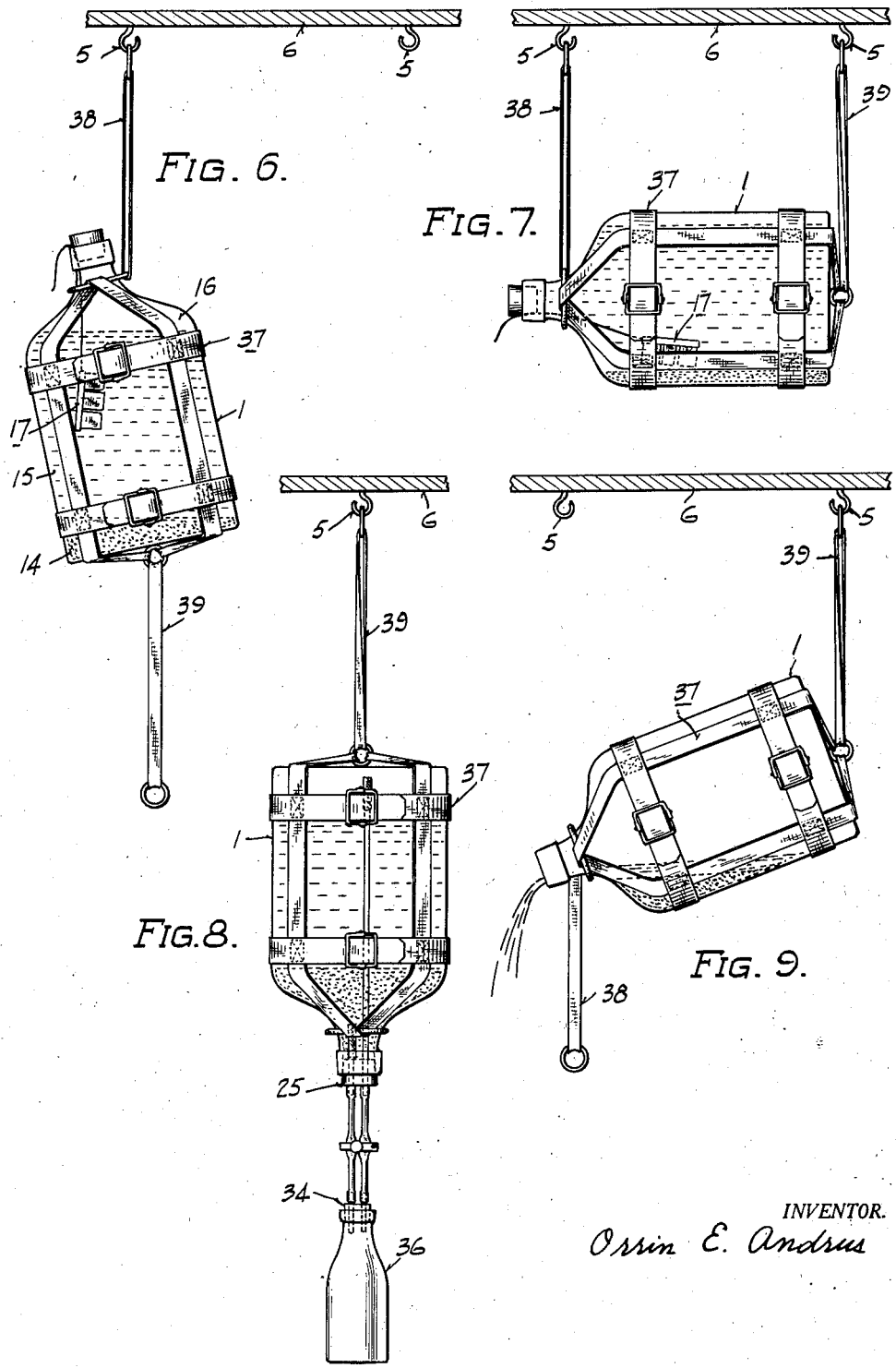

Dec. 8, 1936.   O. E. ANDRUS   2,063,778
PURIFIER FOR DRINKING WATER
Filed Sept. 19, 1932   3 Sheets-Sheet 3
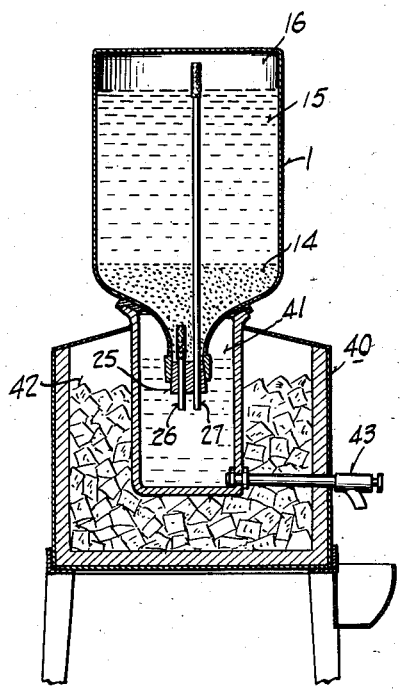
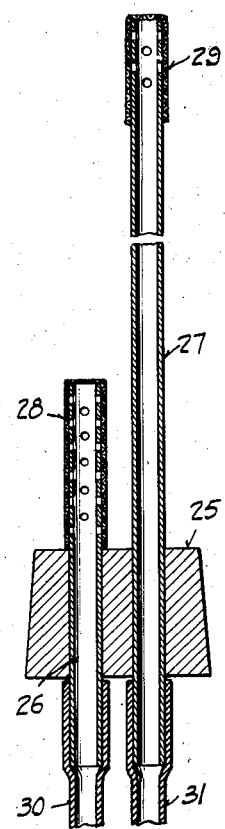
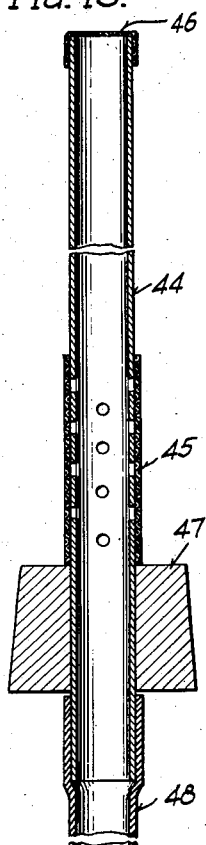
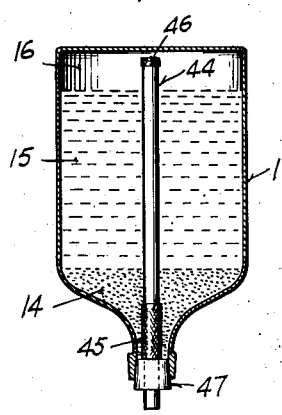
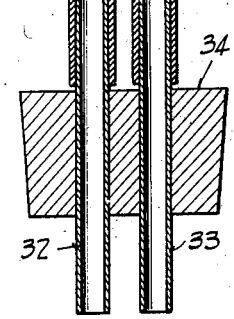
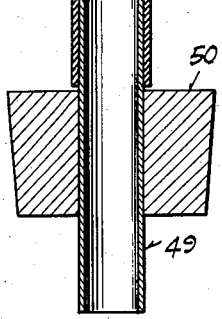
INVENTOR.
Orrin E. Andrus Patented Dec. 8, 1936

2,063,778

UNITED STATES PATENT OFFICE 2,063,778

PURIFIER FOR DRINKING WATER

Orrin E. Andrus, Milwaukee, Wis.

Application September 19, 1932, Serial No. 633,768

5 Claims. (Cl. 210—123)

This invention relates to a purifier for drinking water adapted particularly for home or office use.

The object of the invention is to provide a portable apparatus for purifying relatively small batches of water to clean the same of undesirable impurities and to improve its palatableness.

Another object is to provide a portable apparatus for use in mixing definite quantities of chemicals in a batch of water to form a coagulum, the reaction removing all soluble aluminum or equivalent compounds.

Another object is to provide a portable apparatus for use in mixing insoluble adsorbing materials such as powdered charcoal with a batch of water to be purified.

Another object is to provide a portable apparatus containing a bed of washed sand through which a treated batch of water is filtered, thereby removing coagulum or charcoal with their attached load of impurities.

Another object is to provide a portable apparatus, containing a filter bed such as sand, both of which may be readily washed free from charcoal or coagulum after each batch cycle of operation.

Another object is to provide a portable batch filtering apparatus which automatically starts and stops as the filtered water is withdrawn from the attached receptacle.

Another object is to provide a filtering apparatus, the container of which is essentially transparent, thereby facilitating the manipulation of the device during the cycle of operations.

Another object is to provide a filtering apparatus, the container of which is supported in a hanging position to facilitate manual operation.

Another object is to provide a portable apparatus including a filter container and a container for collection of the filtered water, both containers being connected in such a manner as to essentially exclude the entrance of dust.

The invention and its objects may be more readily understood by reference to the accompanying drawings, in which:

Fig. 6 is an elevation of a modified form of the apparatus showing it in the charging position;

Fig. 7 is a view showing the apparatus of Fig. 6 in the mixing position;

Fig. 8 is a view showing the apparatus of Fig. 6 in the filtering position;

Fig. 9 is a view showing the apparatus of Fig. 6 in the decanting position;

Fig. 10 is another modification of the apparatus showing it applied to a drinking water cooler;

Fig. 11 is an enlarged sectional view of the tubes illustrated in Figs. 3 and 8, parts being broken away;

Fig. 12 is a further modification of the filtering apparatus in which a single tube is employed, with the apparatus shown in Fig. 10; and Fig. 13 is an enlarged sectional view of a modified form of tubing, parts being broken away.

Figure 1:
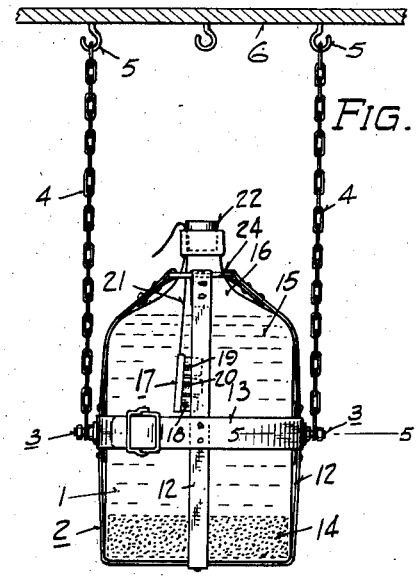
Figure 1 is a front elevation of an embodiment of the invention showing it in the charging position.

Referring to Figs. 1 to 5, inclusive, the preferred form of the suspended apparatus generally consists of a container 1, such as a five gallon glass bottle commonly employed for holding water in coolers. The container 1, is held by a sling 2, made of rope, webbing or metal straps suitably secured in place. Trunnions 3 are fastened to the sling 2 so as to practically balance the empty container. The container 1, by its trunnions 3, is pivotally mounted to the lower ends of chains 4 attached to a pair of hooks 5 fastened to a ceiling 6 or other support, as illustrated in the several figures of the drawings. The trunnion 3 consists of a bolt 7 with washer 8 and nuts 9 and 10. A rigid reinforcing plate 11, longitudinal strap 12 and circumferential strap 13 are gripped by the bolt 7, thereby supporting the container 1 in a balanced position.

Referring to Fig. 1, the container is first suspended in upright position for charging, and is then filled with a bed of clean sand 14 or other filtering material to a suitable depth, usually from one to four inches.

In charging, the container 1 is filled to about three to six inches from the top with the water 15 to be purified. It is preferable to leave an air space 16 in the top of the bottle to facilitate mixing of the contents.

A chemical cartridge 17, similar to that set forth and claimed in applicant's copending application, Serial No. 633,769, filed September 19, 1932, and preferably consisting of a soluble portion of sodium bicarbonate and aluminum sulphate kept in separate porous bags 18 and 19, respectively, and an insoluble portion of powdered charcoal kept in a bag 20 sealed with a water soluble material, as dextrin, is then suspended in the water by a cord or wire 21. Other purifying materials may be employed in the cartridge as set forth in the application above referred to. The relative quantities of the materials dissolved is so proportioned as to obtain the complete conversion of the aluminum, iron, or equivalent metal of the soluble salts into an insoluble coagulum.

Figure 2:
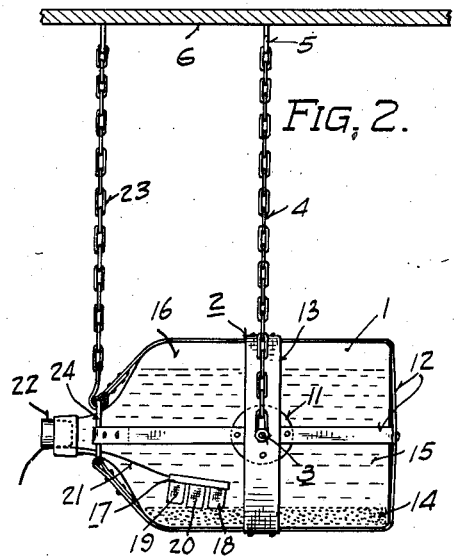
Fig. 2 is a side elevation of the embodiment showing it in the mixing position.

After the cartridge 17 has been suspended in the water, a stopper 22 is placed in the mouth of the container 1, thereby serving to close the container and also to hold the cartridge cord 21. Then the container is suspended in a horizontal position as illustrated in Fig. 2, supported by chains 4 and chain 23 attached to the ceiling 6 and engaging a neck encircling ring 24 of the sling. In this position the container is vigorously agitated to effect a uniform solution and suspension of the chemicals. The dissolved chemicals react to produce a purifying coagulum throughout the entire body of water. The powdered charcoal goes into suspension. After the cartridge 17 becomes empty, the container is tipped to vertical position and the stopper 22 and empty cartridge are removed.

Then a stopper 25, preferably having two openings therethrough, is placed in the container opening. The detail construction of the filtering apparatus can be obtained by referring to Figs. 3 and 11. The stopper 25 has a short glass or metal tube 26 extending through one of the openings therein and into the container a short distance. The stopper 25 also has a long glass or metal tube 27 extending through the other opening therein and to within a short distance of the bottom of the container. The short tube 26 is preferably perforated on its inner end and is provided with a suitable arrangement to prevent the sand from entering, as by a screen 28. The inner end of the long tube 27 is preferably perforated and covered with a screen 29, to prevent the accidental entrance of sand into the tube.

The tubes 26 and 27 connect at their outer ends with flexible rubber tubes 30 and 31, respectively, each of which connects to tubes 32 and 33, respectively, passing through the stopper 34.

Figure 3:
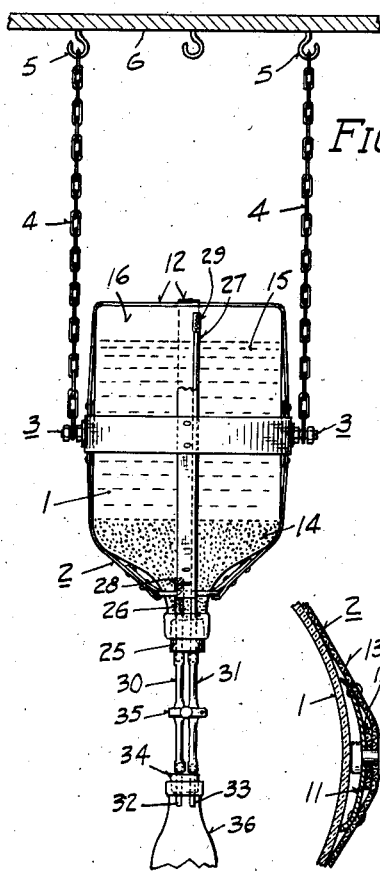
Fig. 3 is a view similar to Fig. 1 showing the container in the filtering position.

After the rubber tubes 30 and 31 have been restricted with a pinch clamp 35 or other suitable means, the container 1 is tipped upside down as illustrated in Fig. 3. The sand 14 then drops to the stopper end of the container. The container may be given a rotary motion to insure the even distribution of the sand over the screen 28 at the inner end of the tube 26. The air space 16 moves to the top of container 1 and surrounds the upper end of tube 27.

The stopper 34 is placed in the mouth of a bottle or other receptacle 36. The rubber tubes 30 and 31 are then released from restriction and the water 15 starts to filter through the sand 14, passes through the screen 28 and tubes 26, 30, and 32 and into the receptacle 36. At the same time, displaced air from the receptacle 36 passes upwardly through tubes 33, 31, and 27 into the air space 16 of the container. When the receptacle 36 becomes filled, the filtering operation automatically stops. The filled receptacle may be replaced by an empty one when needed, at which time the filtering operation will start again.

During the filtering operation, the coagulum with its load of attached impurities adheres to the upper sand surface allowing the purified water to pass through the sand bed. The layer of coagulum, on the upper surface of the sand, also aids in filtering out impurities. The film of coagulum formed around the sand particles during the charging operation further aids in purifying the water passing between the grains of sand.

Figure 4:
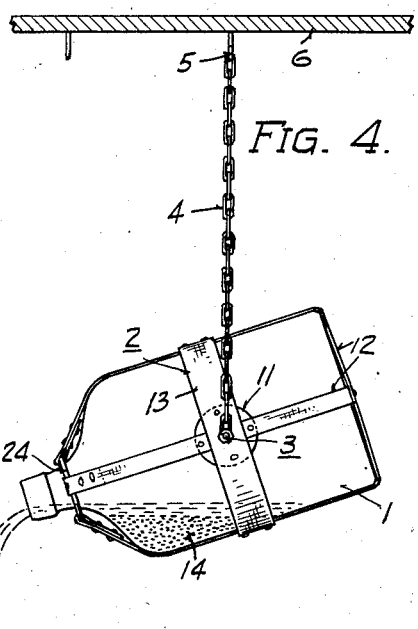
Fig. 4 is a view similar to Fig. 2 showing the decanting position of the container.
Figure 5:
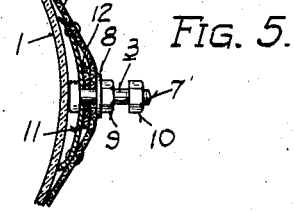
Fig. 5 is an enlarged fragmentary sectional view taken on the line 5—5 of Fig. 1.

When substantially all of the water 15 has been filtered, the container 1 is returned to its upright position, the stopper 25 removed, and cleaning water added. Stopper 22 is then inserted and the container 1 is suspended in the horizontal position as in Fig. 2, and is agitated vigorously to obtain a water suspension of the coagulum and attached impurities, and to scour the inner surfaces of the container. The sand 14 is then allowed to settle, the stopper 22 removed, and the suspension of coagulum and impurities decanted off by tilting the container as illustrated in Fig. 4. This operation of washing the sand is preferably repeated until the container 1 is substantially freed from coagulum. The apparatus is then ready for a new charge of water and chemicals.

The sand 14 may be used respeatedly for filtering operations with replenishment from time to time for losses.

A new cartridge 17 is required for each charge of water to be filtered. Although it is possible to filter an indefinite number of batches of water with but one charge of chemicals by eliminating the washing operation, it is not advisable.

It is preferable to introduce the chemicals in cartridge form, although it is within the scope of this invention to add the chemicals in other ways either separately or simultaneously in solid or solution form. It also is within the scope of this invention to use either or both coagulum forming chemicals and non-soluble adsorbing chemicals such as charcoal.

A modified form of the suspended apparatus is illustrated in Figs. 6 to 9, inclusive. The container 1 is held by a sling 37 preferably made of webbing. The sling is constructed with a support 38 at its neck end and a support 39 at its bottom end, by means of which the container may be suspended in different positions from a pair of hooks 5 fastened to a ceiling 6 or other support. The operation of the apparatus is similar to that of the previously described pivoted form, differing only in the method of suspending. Fig. 6 illustrates the charging position and corresponds to Fig. 1. Fig. 7 illustrates the mixing position and corresponds to Fig. 2. Fig. 8 illustrates the filtering position and corresponds to Fig. 3. Fig. 9 illustrates the decanting position and corresponds to Fig. 4.

The modification shown in Fig. 10 illustrates the adaptation of the invention to drinking water coolers, as employed in offices. Instead of utilizing a receptacle 36, the container is mounted on the cooler 40 which has a water chamber 41 surrounded by an ice container 42 or other cooling arrangement. A faucet 43 is disposed for withdrawing water from chamber 41. The tubes 26 and 27 connect the chamber 41 for the filtration of water into the latter. In this case, when the chamber 41 is sufficiently filled with water to prevent air from entering the mouth of the tube 27, the pressure within the container 1 diminishes until the filtering operation ceases. The filtering operation is automatically resumed after sufficient water is withdrawn from the faucet 43 to lower the water level in chamber 41 to a point below the mouth of the tube 27.

The modification shown in Fig. 12 illustrates a device, for use with a drinking water cooler, in which a single tube 44 is substituted for the two tubes 26 and 27 in Fig. 10. The tube 44 is of sufficient diameter to allow the simultaneous flow of water and air in opposite directions. A tube having an inside diameter of ⅝ inch is satisfactory for this purpose. The tube 44 has a screened opening 45 lying beneath the sand bed 14 during the filtering operation, and another screened opening 46 extending into the air space 16 during the filtering operation. The tube 44 extends through a single hole stopper 47 which seals the container 1. During the filtering operation the water 15 flows from the sand bed 14 into the screened opening 45. The air enters the container 1 from the tube 44 passing from the screened opening 46 into the air space 16.

The single tube modification of Fig. 12 can be substituted for the double tube arrangement of Figs. 3 and 8 by adding flexible tubing 48, and tubing 49 provided with a stopper 50 as illustrated in Fig. 13. In operation the tubes 44, 48, and 49 serve to convey the water downward from container 1 to receptacle 36 and also to convey the air upward from receptacle 36 to container 1.

Where the container 1 is not suspended, but is supported on a stand either in connection with the chamber 41 or with the closed receptacle 36, the container is preferably of such size as to allow manual lifting and shaking of the same for the charging, mixing, washing and decanting operation.

Various embodiments of the invention may be employed within the scope of the accompanying claims.

I claim:

1. An apparatus for use in purifying small batches of water for drinking purposes, comprising a portable glass bottle-like container for manual agitation following the charging operation to thereby disperse a definite quantity of coagulating and adsorbing chemicals throughout the body of water, a sling support in which the container is suspended in horizontal position during the agitating operation and in a vertical position during the charging and filtering operations, a granular filter bed for the removal of the coagulating and adsorbing material from the water, a stopper adapted to close the mouth of the container and having a screened opening for the removal of the filtered water from the granular filter bed when the container is tipped to filtering position, a tube connecting with another opening in the stopper and extending to the other end of the container for admitting air thereto, the portable container and contained filter bed being disposed for cleaning with water by manual agitation of the container and contents followed by decantation of the water suspension of impurities and insoluble purifying materials.

2. An apparatus for use in purifying small batches of water for drinking purposes, comprising a manually agitated container for the dispersion of a definite proportion of purifying chemical throughout a batch of raw water, said container being of transparent bottle-like construction with a single stopper opening at one end, a pivoted support about which the container is rotated to a horizontal position for the agitating operation and to a vertical position for the charging and filtering operations, a filter bed within the container for the removal of insoluble purifying chemicals from the treated water, a stopper to close the mouth of the container, an opening through said stopper for the removal of the filtered water from the container, said opening being connected with a screen for retaining the filter bed within the container, a second opening through said stopper for admitting air into the container during the filtering operation, the filter bed being of loose sand capable of dispersion by manual agitation during the cleaning operation to scour the inner surface of the container and to facilitate the water suspension of the previous deposit of purifying chemicals and attached impurities, the container being movable about the pivots to enable said wash water suspension to be decanted from the granular filter bed.

3. The method of purifying water in batches, comprising providing purifying chemicals in a batch of water in a portable container having a loose granular filter bed, the container being disposed in a position to effect covering of an outlet therefrom by the filter bed, filtering the water through said filter bed as the water is withdrawn from said container, and thereafter washing said filter bed within said container preparatory to purifying another batch of water.

4. The method of purifying water in batches, comprising providing purifying chemicals in a batch of water in a portable container having a loose granular filter bed, the container being disposed in a position to effect covering of an outlet therefrom by the filter bed, filtering the water through said filter bed as the water is withdrawn from said container, and thereafter adding water to said container and shaking the same to wash said loose filter bed and decanting the wash water from said filter bed material preparatory to purifying another batch of water.

5. The method of purifying water in batches, comprising introducing a batch of water into a portable container having a loose finely divided filter bed therein, adding a quantity of purifying chemical to the water and shaking the container to agitate the water and thoroughly disperse the chemical throughout the same, disposing the container in a position to effect covering of an outlet therefrom by the filter bed, and thereafter filtering the water through said filter bed.

ORRIN E. ANDRUS.